United States Patent
Kavanagh et al.

(10) Patent No.: US 9,432,211 B2
(45) Date of Patent: Aug. 30, 2016

(54) CONTENT DELIVERY SESSION ACCOUNTING FOR ACCESS/NETWORK SERVICE PROVIDER

(75) Inventors: Alan Kavanagh, Danderyd (SE); Suresh Krishnan, Suwanee, GA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 181 days.

(21) Appl. No.: 13/224,791

(22) Filed: Sep. 2, 2011

(65) Prior Publication Data
US 2013/0060931 A1 Mar. 7, 2013

(51) Int. Cl.
| | |
|---|---|
| *G06F 15/173* | (2006.01) |
| *H04L 12/28* | (2006.01) |
| *H04L 12/24* | (2006.01) |
| *H04L 29/12* | (2006.01) |
| *H04L 12/26* | (2006.01) |
| *H04M 15/00* | (2006.01) |
| *H04L 29/06* | (2006.01) |

(52) U.S. Cl.
CPC ....... *H04L 12/2874* (2013.01); *H04L 12/2498* (2013.01); *H04L 12/2876* (2013.01); *H04L 29/12245* (2013.01); *H04L 43/026* (2013.01); *H04L 43/028* (2013.01); *H04M 15/82* (2013.01); *H04M 15/8228* (2013.01); *H04L 65/4069* (2013.01); *H04L 69/22* (2013.01)

(58) Field of Classification Search
CPC .. H04L 12/28; H04L 12/56; H04L 29/12245
USPC ................................................. 709/223–224
See application file for complete search history.

(56) References Cited

U.S. PATENT DOCUMENTS

| | | | |
|---|---|---|---|
| 6,999,449 B2* | 2/2006 | Barna et al. ................. | 370/352 |
| 7,675,885 B2* | 3/2010 | Nasielski et al. ............ | 370/331 |
| 7,934,016 B2* | 4/2011 | DiBiasio ............ | H04L 12/5695 709/224 |
| 2002/0152319 A1* | 10/2002 | Amin et al. ................. | 709/232 |
| 2003/0097443 A1 | 5/2003 | Gillett et al. | |
| 2003/0125013 A1 | 7/2003 | Mizell et al. | |

(Continued)

FOREIGN PATENT DOCUMENTS

WO     WO 2010045493 A2 *   4/2010   .................... 370/329

OTHER PUBLICATIONS

Npl1: (Title: QoS Requirements for Multimedia Services,Researchgate publication by Cacheda et al; Dec. 2006).*

(Continued)

*Primary Examiner* — Aftab N. Khan
(74) *Attorney, Agent, or Firm* — Ericsson Inc.

(57) ABSTRACT

An edge node of an Access/Network Service Provider (ANP) network tracks the delivery into the ANP network of content from Contzzent Providers (CP), and generates accounting sessions with an accounting server. The edge node is provisioned with the IP addresses of known CP servers. A content delivery session, characterized by a CP IP address and a content identifier, such as a Differentiated Service Code Point (DSCP) value, is started upon the source IP address of a packet matching a known CP, and a packet count is incremented for each subsequent packet from the CP with the same content identifier. An accounting session is initiated with an accounting server when the content delivery session is started, and the accounting session is terminated, with the packet count for the session, upon a time-out since the last packet received. Multiple content delivery sessions may be ongoing simultaneously.

16 Claims, 4 Drawing Sheets

(56) References Cited

U.S. PATENT DOCUMENTS

| | | |
|---|---|---|
| 2003/0172136 A1* | 9/2003 | Katagawa et al. ............ 709/220 |
| 2003/0177212 A1* | 9/2003 | Givoly et al. ................ 709/223 |
| 2004/0028055 A1 | 2/2004 | Madour et al. |
| 2005/0021718 A1* | 1/2005 | Sinclair ................ H04L 41/044 709/223 |
| 2006/0098643 A1* | 5/2006 | Pfeffer et al. ................ 370/389 |
| 2007/0097926 A1 | 5/2007 | Liu et al. |
| 2007/0220163 A1* | 9/2007 | Khouderchah et al. ...... 709/231 |
| 2008/0147524 A1* | 6/2008 | Connelly ........................ 705/30 |
| 2009/0034426 A1* | 2/2009 | Luft et al. ..................... 370/252 |
| 2010/0325515 A1* | 12/2010 | Lohmar et al. ............... 714/752 |
| 2012/0059749 A1* | 3/2012 | Sharma et al. ................ 705/34 |

OTHER PUBLICATIONS

International Search Report for PCT/IB2012/054252 with mailing date of Jan. 2, 2013; 5 pages.

* cited by examiner

CONTENT DELIVERY SESSION ACCOUNTING FOR ACCESS/NETWORK SERVICE PROVIDER

TECHNICAL FIELD

The present invention relates generally to data communication networks, and in particular to a system and method of accounting for content delivery sessions in an Access/Network Service Provider network.

BACKGROUND

As computer networks (both wired and wireless) become ubiquitous, with higher data rates and lower latencies, the real-time or near real-time delivery of multimedia content (e.g., music, movies, and the like) via computer networks is supplementing traditional distribution channels, such as the sale/rental of physical media (e.g., DVDs). This trend is expected to continue, and indeed many predict that on-demand streaming of multimedia content will become the primary means of content distribution to end users.

FIG. 1 depicts a representative network system 10, as currently widely deployed. A Content Provider (CP) network 12, including a plurality of Content Provider servers 14 (CP1 . . . CPn), connects to the Internet Backbone 15. The CPs pay an Internet backbone provider for access to the backbone bandwidth, and charge subscribers for access to content. FIG. 1 also depicts a representative network 16 of an Access/Network Service Provider (ANP), a subset of which is known as an Internet Service Provider (ISP), also connected to the Internet Backbone 15. The ANPs also pay for Internet backbone 15 connectivity, and charge subscribers for network access (e.g., flat monthly fee, bandwidth usage fees, etc.).

Users receive content from CPs across the Internet backbone 15 and through the ANP network 16. In particular, content flows from CP servers 14, across the backbone 15 to an edge node 18 of the ANP network 16, and from there to an end user device 22, such as a computer terminal, set-top box, gaming console, DVR, or similar content-rendering or content-storage device. Of course, the networks 12, 15, 16 include nodes not depicted in FIG. 1 for clarity. For example, the CP network 12 includes subscriber databases, content databases, web sever nodes for direct access and content ordering via a web browser, and the like. An Authentication, Authorization and Accounting (AAA) server 20 is depicted in the ANP network 16 as one example of an accounting server (which may also exist in the CP network 12).

The growth of CPs (e.g., Netflix, Hulu, Lulu, and the like) and the volume and variety of content they offer for streaming to the end user devices 22 has recently exploded, and continues to grow as more CPs are formed, and content owners license more content for streaming distribution. This growth has caused enormous traffic growth in the ANP network 16, to handle not only the massive bandwidth, but also its high Quality of Service (QoS) demands. Currently, there is no technical mechanism for ANPs to charge CPs for the delivery of the CPs' content to the end users—the CPs' delivery costs terminate at the Internet backbone 14. In order for ANPs to expand their network 16 infrastructure to handle the increase in bandwidth and QoS requirement, ANPs must be able to charge the originator of the traffic for its delivery to end users.

Additionally, the ANPs currently have no way to differentiate different traffic types from CPs, where some traffic requires a high QoS and other traffic can tolerate a lower QoS, such as non-guaranteed bit-rate. Since the ANPs cannot differentiate these traffic types, they cannot charge for them accordingly. Some ANPs have implemented bandwidth caps and/or additional fees for bandwidth in excess of predetermined amounts. These approaches are unpopular with subscribers, and do not address the QoS and Quality of Experience issues.

SUMMARY

According to embodiments of the present invention described and claimed herein, an edge node of an ANP network tracks content delivery, and generates system accounting requests for initiated content delivery sessions. The edge node is provisioned with the IP addresses (or address ranges) of known CP servers. A source IP address field and a content identifier are extracted from incoming IP packets. In one embodiment, the content identifier may comprise the value of a Differentiated Service Code Point (DSCP) field. If the source IP address matches a known CP server IP address, a content delivery session is started, identified by the CP IP Address and content identifier. An accounting request message is sent to an accounting server to initiate an accounting session. A packet count associated with the content delivery session is incremented every time a packet for the session is received (i.e., the source IP and content identifier fields match those of the session). Multiple content delivery sessions may be ongoing simultaneously. An activity timer is started when a content delivery session begins, and reset upon receipt of each packet for the session. When the timer reaches a predetermined value (i.e., a predetermined duration since the last packet for a session), the session is deemed terminated, and an accounting message, including the packet count for the session, is sent to the accounting server to terminate the accounting session. In one embodiment, the accounting server is an AAA server, and the accounting server messages are RADIUS messages.

One embodiment relates to a method, performed by an edge node in an ANP network, of accounting for content delivered from a CP through the ANP network to a user. A source IP address of each incoming packet is inspected. The source IP address is compared to a plurality of predetermined source IP addresses or address ranges identifying known CPs. If the incoming packet source IP address matches a CP, a content indicator of the incoming packet is inspected. If the content indicator does not match a content indicator of an ongoing content delivery session from the CP, an accounting session for a new content delivery session is initiated with an accounting server. If the content indicator matches a content indicator of an ongoing content delivery session from the CP, a packet count associated with the content delivery session is incremented.

Another embodiment relates to an edge node operative in an ANP network, through which content is delivered from a CP to a user. The edge node includes a transceiver implementing an ANP interface and a packet data network (PDN) interface. The edge node also includes a controller operative to control the transceiver. The edge node further includes memory operatively connected to the controller. The memory maintains a data structure for one or more ongoing content delivery sessions, each content delivery session data structure including a CP IP address, a content indicator, and a packet count. The controller is operative to inspect a data packet received by the PDN interface of the transceiver and, if the data packet is associated with an ongoing content delivery session, increment the packet count, reset the timer value, and deliver the data packet towards a destination IP address via the ANP interface. If the data packet is not associated with an ongoing content delivery session, the controller is operative to initiate an accounting session for a new content delivery session with an accounting server via the ANP interface.

DETAILED DESCRIPTION

According to embodiments of the present invention, an edge node 18 of an ANP network 16 inspects incoming data packets to determine whether they belong to an ongoing, or are the start of a new, content delivery session. As used herein, a content delivery session is a duration during which the edge node 18 receives data packets from a CP related to the same content, and delivers the packet to (ultimately) an end user device 22, via the ANP network 16. Multiple content delivery sessions may be ongoing at any given time. A content delivery session is defined by at least the CP, as identified by an IP address, and a content indicator. In one or more embodiments, the content indicator may comprise the value in a Differentiated Service Code Point (DSCP) field. In the discussion herein, reference is made to a DSCP value. However, this is not a limitation, and a different content identifier may be used within the broad scope of the present invention. Similarly, an AAA server 20 is depicted in the ANP network 16, and reference is made herein to exchanging accounting messages (e.g., RADIUS messages) with the AAA server 20. However, in the broad practice of the present invention, accounting messages may be handled by a different accounting server, which may be a stand-alone, dedicated accounting server or an accounting function implemented in a different server.

Figure 1:
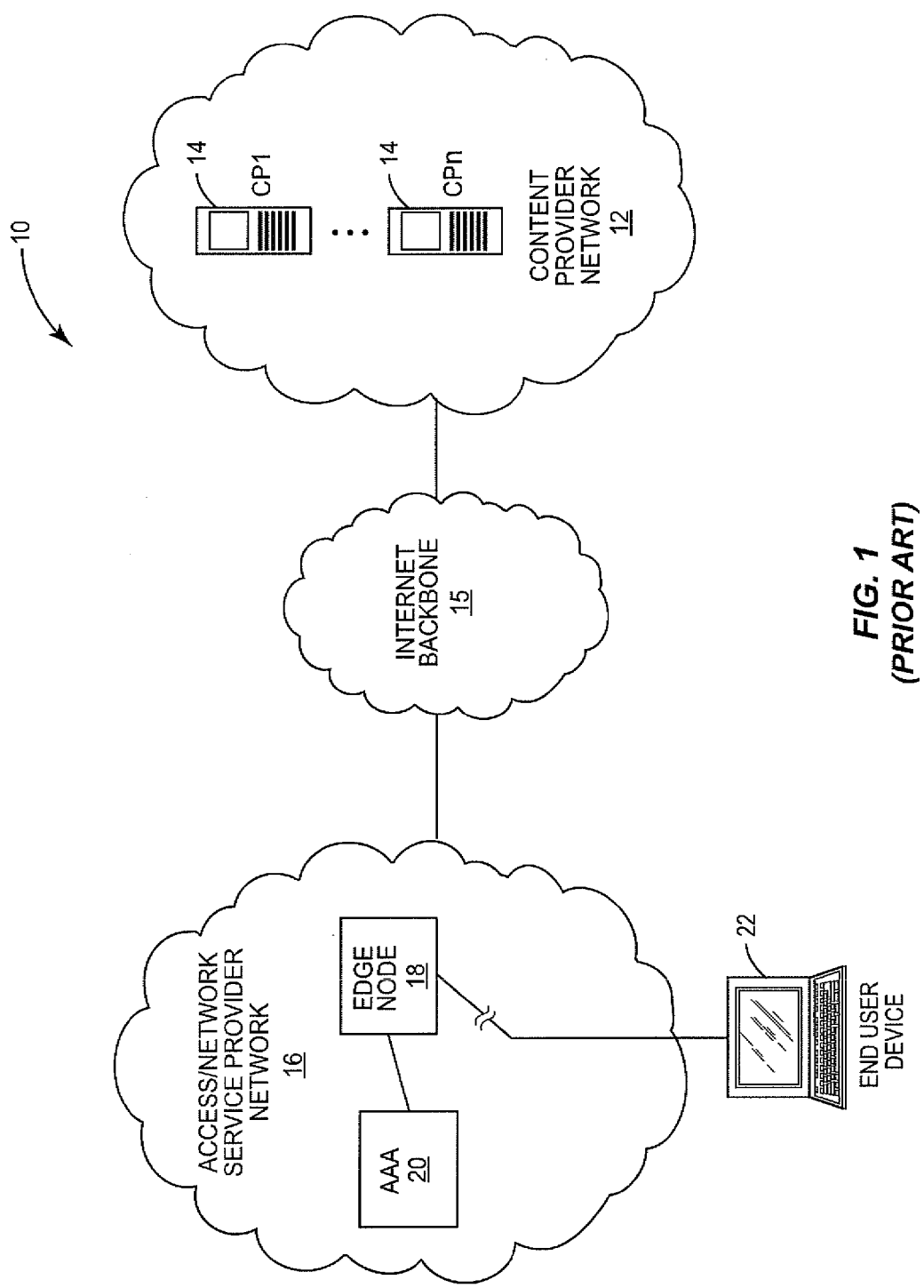
FIG. 1 is a block diagram of interconnected networks for the delivery of content from Content Providers to end users.
Figure 2:
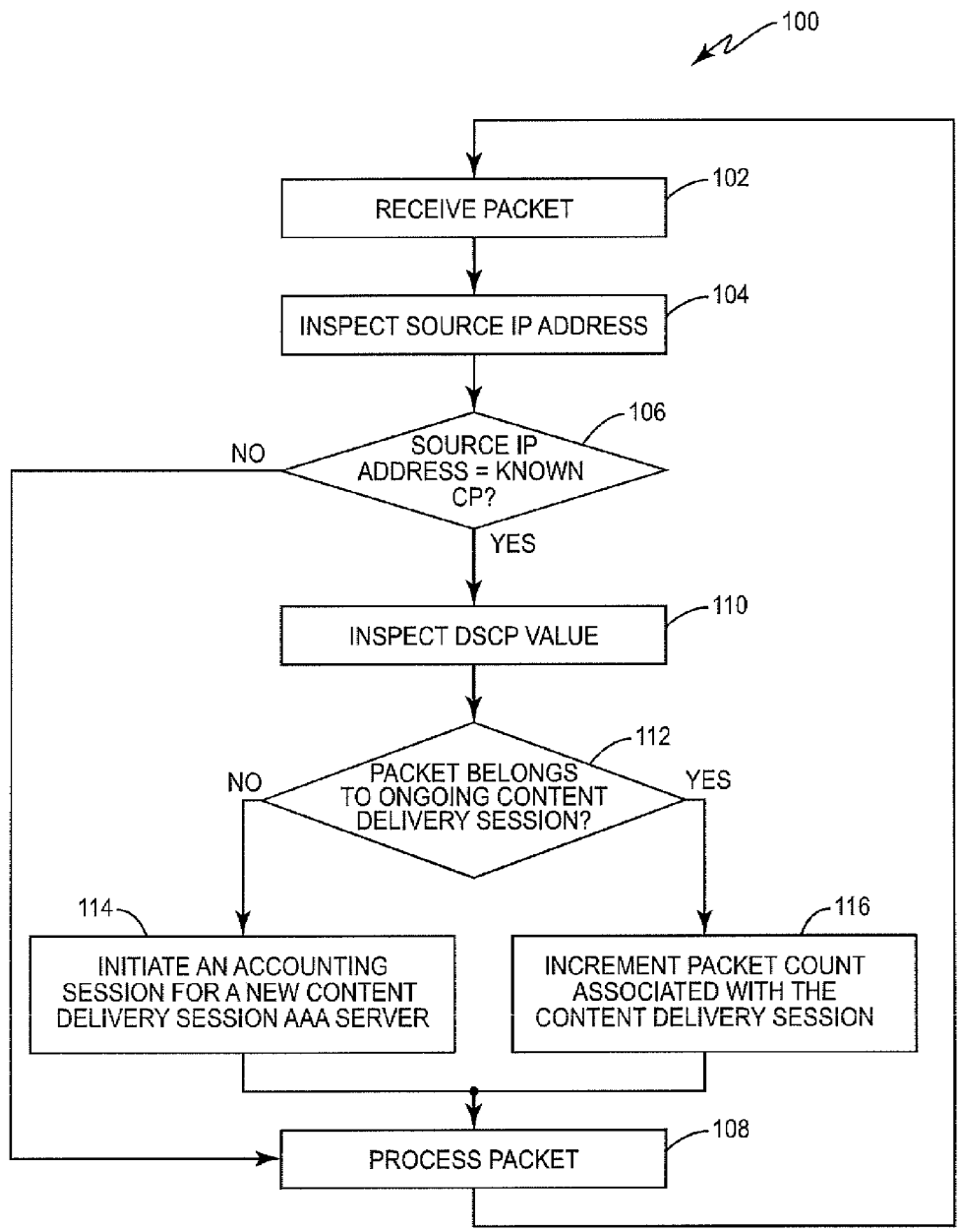
FIG. 2 is a flow diagram of a method of accounting for content delivery sessions at an edge node of an Access/Network Service Provider network.

FIG. 2 depicts a method 100 of processing data packets at an edge node 18 of an ANP network 16 to provide accounting for content delivery sessions. The method 100 is invoked every time the edge node 18 receives a data packet (block 102). The source IP address of the packet is inspected (block 104). The Internet Protocol (IP) is a well known network protocol. IP addresses are also well known, and need not be explained in detail here. Each data packet transmitted in a Packet Data Network, such as the CP network 12, the Internet backbone 15, and/or the ANP network 16, includes a source IP address (i.e., the src_ip field of the packet header) indicating the location (in network terms) of the node that generated the packet, and a destination IP address indicating the network node to which the packet should be forwarded (in this case, the IP address of the end user device 22). According to embodiments of the present invention, each edge node 18 of the ANP network 16 is provisioned with the IP addresses (or address ranges) of known CP servers 14. The edge node 18 inspects each incoming data packet, comparing the source IP address in the packet header with the known CP IP addresses (block 106). If there is no match, the data packet is processed appropriately (block 108) (e.g., forwarded towards its destination IP address).

If the source IP address of the data packet does match a known CP IP address (block 106), then the edge node 18 proceeds to inspect a content indicator such as a DSCP value in the packet header (block 110). The DSCP is a 6-bit Differentiated Services Code Point field in the IP header that classifies the packet in a coarse-grained manner into a traffic class. Each traffic class shares certain properties, such as QoS requirements, traffic type (e.g., voice, video, streaming music, and the like), destination address, and the like. Generally, each unique DSCP value in packets generated by the same CP server will correspond to the same content—e.g., data to be rendered into one movie. However, this is not a limitation of the present invention. For example, a CP server could assign the same DSCP value to packets carrying different content, e.g., two different movies delivered to the same household or otherwise charged to the same subscriber. The correspondence between DSCP values and actual content delivery is not critical. Rather, the important consideration is that the packets (whatever the content they represent) share the same QoS requirements, and are all routed through the ANP network 16. Accordingly, the ANP may track, and charge, the CP accurately for the traffic the CP imposes on the ANP network 16 in the delivery of content to end users, without regard to accurately correlating individual data packets with specific content. However, in general, it may be assumed (at least for the purposes of explanation herein) that DSCP values from a particular CP server are unique to a specific instance of content, e.g., a particular movie.

As used herein, a "content delivery session" means a succession of packets received by an edge node 18 of an ANP network 16, the packets originating from the same CP (as indicated by comparison between the source IP address of the packets and the provisioned CP IP addresses) and including the same content indicator, such as a DSCP value. As one example, a content delivery session may comprise a series of packets having the same source IP address and DSCP value, wherein all of the packets have the same destination IP address—that is, they are all routed to the same end user (or household). As another example, a content delivery session may comprise a plurality of unicast streams—that is, a number of series of packets having the same source IP address and DSCP value, with different destination IP addresses. The edge node 18 may manage a plurality of different content delivery sessions simultaneously. Once initiated, as explained further herein, a content delivery session is considered ongoing until the delay after the last packet received for the session reaches a predetermined value.

Upon inspection of the DSCP in the incoming data packets (block 110), the edge node 18 determines whether the packet belongs to an ongoing content delivery session (block 112). If not, a new content delivery session is initiated, including initiating an accounting session by sending an accounting request to an AAA server 20 (block 114). In one embodiment, the accounting session request comprises a Remote Authentication Dial In User Service (RADIUS) Accounting_Request message including at least the CP IP address and the DSCP value. The Accounting_Request message may include additional information relevant to billing the CP, such as the traffic type, minimum QoS level, required bit-rate, and the like. As known in the art, RADIUS is a networking protocol for the authentication of users and devices prior to network access, authorization of users and devices for certain network services, and accounting for usage of those services. Embodiments of the present invention utilize at least the accounting functionality of the RADIUS protocol, enabling the ANP to charge CPs for delivering their content to end users. Once the new content delivery session is initiated, the data packet is delivered into the ANP network 16 toward the end user device 22.

Once a content delivery session is established at the edge node 18, including having initiated an accounting session with an AAA server 20, subsequent packets received from the same CP go through the same inspections (blocks 102-110). When a subsequent packet is determined to belong to an ongoing content delivery session (block 112) (i.e., the source IP address and DSCP value match the CP IP address and DSCP of the content delivery session), a packet count associated with the content delivery session is incremented (block 116) and the packet is delivered into the ANP network 16 toward the end user device 22 (block 108).

The method 100, initiating new content delivery sessions and incrementing the packet count for ongoing content delivery sessions, is repeated indefinitely. At some point, ongoing content delivery sessions will terminate as the full content is delivered (i.e., a movie comes to an end). In one embodiment, the edge node 18 utilizes an idle timeout functionality associated with each ongoing content delivery session to detect the termination of the session. For example, a timer may be started upon initiation of the content delivery session, and reset upon the receipt of each subsequent data packet associated with the content delivery session. The session termination is then detected when the timer reaches a predetermined value—that is, when the duration since the last received data packet associated with the content delivery session reaches a predetermined length. The timer may comprise a count-down timer initialized and reset to a predetermined value, wherein the idle timeout duration is reached when the timer counts down to zero. Alternatively, the timer may be initialized and reset to zero, and its value compared to a predetermined value to detect the idle timeout duration. In either case, the timer may comprise a hardware counter clocked at a set frequency or a software construct, such as a counting loop.

Regardless of the timer implementation, when an ongoing content delivery session times out, the edge node 18 terminates the corresponding accounting session with the AAA server 20, and provides the AAA server 20 with the count of received data packets associated with the session. In one embodiment, the edge node 18 terminates the accounting session by sending a RADIUS Accounting_Request message including at least the CP IP address and DSCP, and requesting to stop the accounting session. In one embodiment, the Accounting_Request message additionally includes the total packet count for the content delivery session. In other embodiments, the edge node 18 periodically sends the AAA server 20 incremental packet counts throughout the content delivery session, and the session terminating message includes only the final incremental packet count. The frequency of such incremental packet count messages may be configured for each edge node 18, based on, e.g., elapsed time or packet count threshold, but in general may be as often as every received packet.

Figure 3:
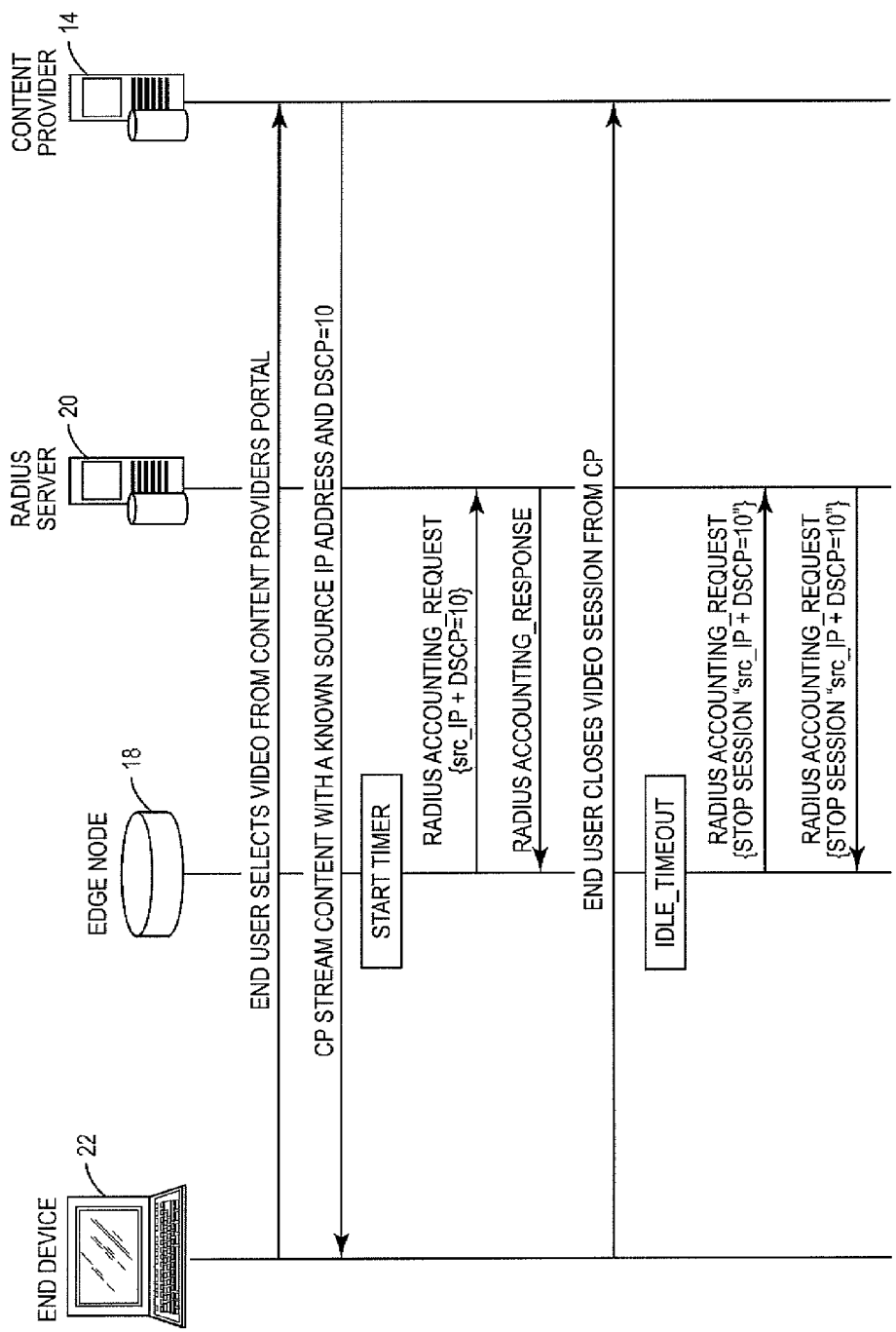
FIG. 3 is a signal flow diagram of the method of FIG. 2.

FIG. 3 depicts a network message signaling diagram corresponding to the method 100 according to one embodiment of the present invention. Initially, a user requests the delivery of content from a CP, such as from the end user device 22. However, the origin of this request is not germane to embodiments of the present invention. For example, a user may select, e.g., a movie via a CP's web site, using, e.g., a browser on a smartphone or computer terminal, and request delivery of the content to the end user device 22, such as a set-top box, DVR, gaming console, or the like.

In any event, the content delivery request is received by (or routed to) a CP server 14 in the CP network 12. The CP server 14 begins streaming data packets toward the end user device 22 (that is, across the Internet backbone 15 and into the ANP network 16). All of the data packets associated with the content include the CP server 14 IP address as a source IP address, and include the same content indicator, e.g., DSCP value.

When the first packet is received by the edge node 18 of the ANP network 16, the edge node 18 sends a RADIUS Accounting_Request message to the AAA server 20. The Accounting_Request includes at least the CP IP address and DSCP value that identify the content delivery session. The AAA server 20 responds with a RADIUS Accounting_Response message, per the RADIUS protocol.

When the content is fully delivered, or if, as depicted in FIG. 3, the user terminates the delivery of content from the CP, the edge node 18 will wait until an Idle Timeout event occurs, indicating the predetermined duration has expired since receipt of the last data packet for the ongoing content delivery session. In response to the timeout, the edge node 18 sends a RADIUS Accounting_Request message to the AAA server 20 to stop the accounting session. The Accounting_Request includes at least the CP IP address and DSCP value that identify the content delivery session, as well as a total (or incremental) packet count. The AAA server 20 responds with a RADIUS Accounting_Response message, per the RADIUS protocol. The accounting session thus recorded by the AAA server 20 generates a charging transaction between the ANP and the CP at a higher layer and according to negotiated terms, the details of which are not germane to an explanation of the present invention.

Figure 4:
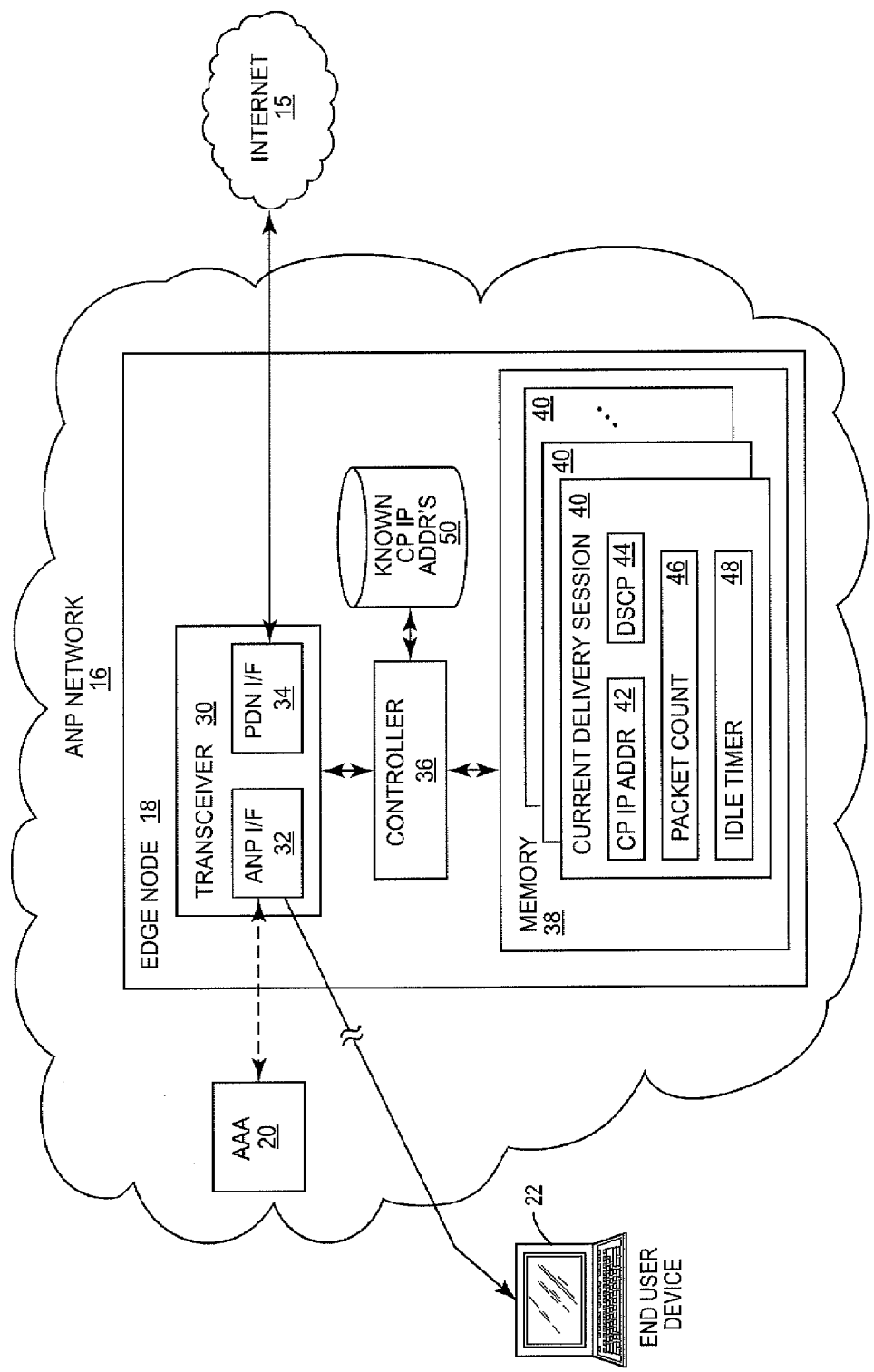
FIG. 4 is a functional block diagram of an edge node of an Access/Network Service Provider network.

FIG. 4 depicts a functional block diagram of the edge node 18 of the ANP network 16. The edge node 18 includes a transceiver 30 operative to at least receive data packets from a Packet Data Network (PDN) such as the Internet 15 via a PDN interface 34, and to forward the data packets towards an end user device 22 in the ANP network 16 via an ANP interface 32. The ANP interface 32 is further operative to exchange signaling messages, such as RADIUS messages, with an AAA server 20. The APN interface 32 and PDN interface 34 represent functionality, and are not necessarily separate physical interfaces of the transceiver 30.

A controller 36 controls the overall operation of the edge node 18, including the transceiver 30. The controller 36 may comprise a state machine implemented in hardware or programmable logic together with appropriate firmware; a custom processor implemented in an ASIC; a general purpose microprocessor or Digital Signal Processor (DSP), together with appropriate software; or any combination thereof. The controller 36 is operatively connected to machine-readable memory 38, such as RAM, ROM, PROM, Flash memory, magnetic or optical media together with appropriate read/write hardware, or the like. The memory 38 is operative to store general software, such as an operating system, and in particular software modules operative to implement the method 100, and other functionality described herein, on the controller 36.

In one embodiment, the memory 38 is operative to store a data structure 40 associated with each ongoing content delivery session. Each content delivery session data structure 40 stores a CP IP address (or range of addresses) 42, a DSCP value 44, and a packet count 46. The data structure 40 may additionally store an idle timeout value 48. As depicted in FIG. 4, a plurality of content delivery session data structures 40 may be maintained in the memory 38 simultaneously, corresponding to a plurality of ongoing content delivery sessions.

In one embodiment, the edge node 18 additionally includes a database 50 storing known CP IP addresses (or address ranges). CP IP addresses in the database 50 may be provisioned in the edge node 18 by the ANP operator, as business arrangements are negotiated with various CPs. In some embodiments, the database 50 may be stored in memory 38, such as in a non-volatile portion of the memory 38.

Embodiments of the present invention allow an ANP to charge CPs for the delivery of their content. In particular, the ANP can charge the CPs based on the QoS that the CPs request for the delivery. The billing is dynamic, based on the volume of traffic per QoS level. Embodiments of the present invention are applicable for tracking any content delivered through the ANP network 16, including VoD, IPTV, streaming music, and the like.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, performed by an edge router in an Access/Network Service Provider (ANP) network, of accounting for content delivered from a Content Provider (CP) through the ANP network to user devices, the method comprising:
    responsive to determining that a source Internet Protocol (IP) address of an incoming packet matches an IP address of a CP, determining if the incoming packet belongs to one of a plurality of ongoing content delivery sessions from the CP by comparing a Differentiated Service Code Point (DSCP) value of the incoming packet to a plurality of DSCP values associated with the plurality of ongoing content delivery sessions from the CP;
    responsive to determining that the incoming packet does not belong to any of the plurality of ongoing content delivery sessions from the CP, initiating a new accounting session for a new content delivery session with an accounting server, the new content delivery session and the new accounting session being associated with a new DSCP value that is different from the plurality of DSCP values associated with the plurality of ongoing content delivery sessions; and
    responsive to determining that the incoming packet belongs to a first ongoing content delivery session from the CP, incrementing a packet count of an accounting session associated with a first DSCP value of the first ongoing content delivery session, so that the ANP can charge the CP for delivery of content corresponding to the first DSCP value of the first ongoing content delivery session;
    wherein the method further comprises:
    determining that the first ongoing content delivery session has terminated;
    in response to the termination determination, closing the accounting session associated with the first ongoing content delivery session with the accounting server; and
    wherein determining that the first ongoing content delivery session has terminated comprises:
    starting a timer upon initiating the accounting session associated with the first ongoing content delivery session with the accounting server;
    resetting the timer each time the packet count for the first ongoing content delivery session is incremented; and
    determining that the first ongoing content delivery session has terminated when the timer reaches a predetermined value.

2. The method of claim 1 wherein closing the accounting session associated with the first ongoing content delivery session with the accounting server comprises sending the packet count associated with the first ongoing content delivery session to the accounting server.

3. The method of claim 1 wherein the first DSCP value associated with the first ongoing content delivery session comprises a Quality of Service (QoS) value.

4. The method of claim 1, wherein the first ongoing content delivery session comprises a stream of packets having a common DSCP value and a common destination IP address.

5. The method of claim 1 wherein the first ongoing content delivery session comprises a plurality of streams of packets having a common DSCP value, and wherein each of the plurality of streams is associated with a different destination IP address.

6. The method of claim 1 wherein the accounting server comprises an Authentication, Authorization and Accounting (AAA) server.

7. The method of claim 6 wherein initiating a new accounting session for a new content delivery session with the accounting server comprises sending to the AAA server a Remote Authentication Dial In User Service (RADIUS) Accounting_Request message including at least the IP address of the CP and the new DSCP value associated with the new content delivery session.

8. An edge router operative in an Access/Network Service Provider (ANP) network, through which content is delivered from a Content Provider (CP) to user devices, the edge router comprising:
    a transceiver operative to implement an ANP interface and a packet data network (PDN) interface;
    a controller operative to control the transceiver; and
    a memory operatively connected to the controller and operative to store a plurality of data structures associated with a plurality of ongoing content delivery sessions, the plurality of data structures including a plurality of Internet Protocol (IP) addresses corresponding to a plurality of a CPs, a plurality of Differentiated Service Code Point (DSCP) values associated with the plurality of ongoing content delivery sessions, and a plurality of packet counts for the plurality of ongoing content delivery sessions;
    wherein the controller is operative to, responsive to determining that a source IP address of an incoming packet received via the PDN interface of the transceiver matches an IP address of a CP,
        determine if the incoming packet belongs to one of the plurality of ongoing content delivery sessions from the CP by comparing a DSCP value of the incoming packet to the plurality of DSCP values associated with the plurality of ongoing content delivery sessions from the CP;
        responsive to determining that the incoming packet does not belong to any of the plurality of ongoing content delivery sessions from the CP, the controller is further operative to initiate a new accounting session for a new content delivery session with an accounting server via the ANP interface, the new content delivery session and the new accounting session being associated with a new DSCP value that is different from the plurality DSCP values associated with the plurality of ongoing content delivery sessions; and responsive to determining that the incoming packet belongs to a first ongoing content delivery session from the CP, the controller is further operative to increment a packet count of an accounting session associated with the first ongoing content delivery session so that the ANP can charge the CP for delivery of content corresponding to a first DSCP value of the first ongoing content delivery session;

wherein the controller is further operative to close the accounting session for the first ongoing content delivery session with the accounting server upon determining that the first ongoing content delivery session has terminated; and wherein the controller is further operative to start a timer upon initiating the accounting session for the first ongoing content delivery session;

reset the timer each time the packet count for the first ongoing content delivery session is incremented; and determine that the first ongoing content delivery session has terminated when the timer reaches a predetermined value.

9. The edge router of claim 8 wherein the memory further comprises a database of IP addresses of CPs or IP address ranges of CPs, and wherein the controller is further operative to determine that a source IP address of an incoming packet received via the PDN interface of the transceiver matches an IP address in the database of IP addresses or IP address ranges of CPs.

10. The edge router of claim 8, wherein each data structure in the memory further comprises the timer.

11. The edge router of claim 8 wherein the controller is further operative to send the packet count associated with the first ongoing content delivery session to the accounting server upon closing the accounting session for the first ongoing content delivery session with the accounting server.

12. The edge router of claim 8 wherein the first DSCP value associated with the first ongoing content delivery session comprises a Quality of Service (QoS) value.

13. The edge router of claim 8 wherein the first ongoing content delivery session comprises a stream of packets having a common DSCP value and a common destination IP address.

14. The edge router of claim 8 wherein the first ongoing content delivery session comprises a plurality of streams of packets having a common DSCP value, and wherein each of the plurality of streams is associated with a different destination IP address.

15. The edge router of claim 8 wherein the accounting server comprises an Authentication, Authorization and Accounting (AAA) server.

16. The edge router of claim 15 wherein the controller is operative to initiate a new accounting session for a new content delivery session with the accounting server via the ANP interface by sending to the AAA server a Remote Authentication Dial In User Service (RADIUS) Accounting_Request message including at least the IP address of the CP and the new DSCP value associated with the new content delivery session.

* * * * *